US006754490B2

(12) United States Patent
Okoro et al.

(10) Patent No.: US 6,754,490 B2
(45) Date of Patent: *Jun. 22, 2004

(54) INTERNATIONAL ROAMING SERVICE FOR PERMITTING A CELLULAR/WIRELESS TELEPHONE INSTRUMENT TO ACCESS DIFFERENT WIRELESS TELEPHONE NETWORK/SYSTEMS

(75) Inventors: Jeremiah Okoro, Landing, NJ (US); Jesse Eugene Russell, Piscataway, NJ (US)

(73) Assignee: AT&T Wireless Services, Inc., Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,451

(22) Filed: Aug. 27, 1999

(65) Prior Publication Data

US 2003/0013429 A1 Jan. 16, 2003

(51) Int. Cl.[7] .................................................. H04Q 7/20
(52) U.S. Cl. ........................ 455/432.2; 455/552.1; 455/411
(58) Field of Search ......................... 455/432, 435, 455/552, 551, 410, 411, 422, 433, 553, 414–417, 432.2, 432.1, 552.1, 553.1, 414.1, 414.4, 517

(56) References Cited

U.S. PATENT DOCUMENTS

| 5,400,390 | A | * | 3/1995 | Salin ........................... 455/433 |
| 5,463,675 | A | * | 10/1995 | Gerszberg .................... 455/432 |
| 5,661,806 | A | * | 8/1997 | Nevoux et al. ............... 380/25 |
| 5,812,948 | A | * | 9/1998 | Hjern et al. ................. 455/432 |
| 5,933,784 | A | * | 8/1999 | Gallagher et al. ........ 455/552.1 |
| 5,940,512 | A | * | 8/1999 | Tomoike ...................... 455/432 |
| 5,960,340 | A | * | 9/1999 | Fuentes ....................... 455/414 |
| 5,995,842 | A | * | 11/1999 | Jonsson ....................... 455/432 |
| 6,456,858 | B1 | * | 9/2002 | Streter ..................... 455/552.1 |

FOREIGN PATENT DOCUMENTS

| CA | 2276117 | 1/1998 |
| EP | 0163358 | 4/1985 |
| WO | WO 98/31175 | 12/1997 |
| WO | WO 98/02011 | 7/1998 |

* cited by examiner

*Primary Examiner*—Erika Gary
*Assistant Examiner*—Eliseo Ramos-Feliciano
(74) *Attorney, Agent, or Firm*—Klarquist Sparkman, LLP

(57) ABSTRACT

A cellular/wireless foreign subscriber is enabled to use her/his own cellular/wireless telephone instrument in a local cellular/wireless (C/W) network/system by entry of a code and a PIN into the local network/system desired to be used. The local C/W network/system algorithmically responds to the code and PIN by changing characteristics of the radio equipment of the local C/W network/system to accommodate operation of the subscriber's cellular/wireless telephone instrument with the network/system desired to be used.

20 Claims, 5 Drawing Sheets

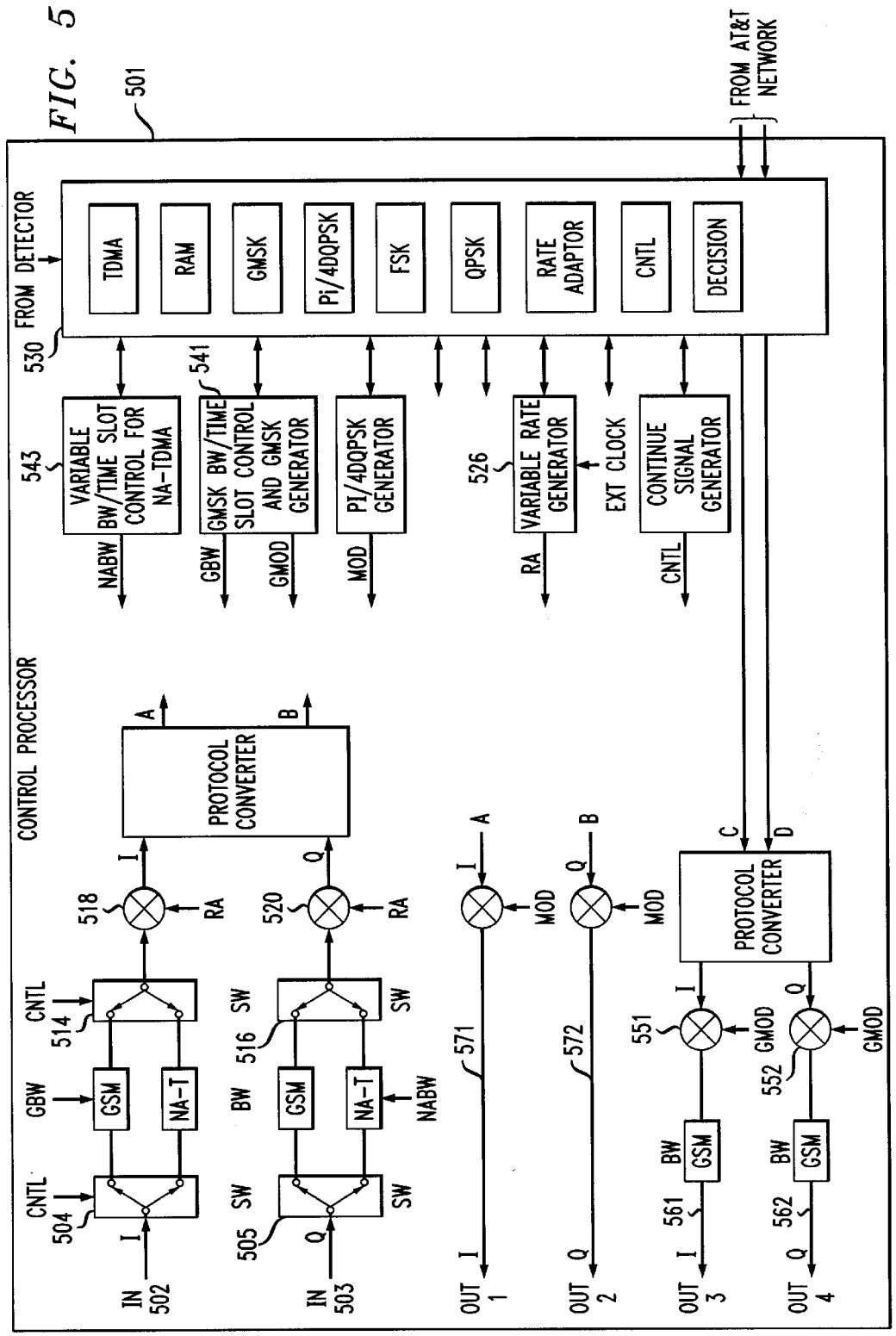

INTERNATIONAL ROAMING SERVICE FOR PERMITTING A CELLULAR/WIRELESS TELEPHONE INSTRUMENT TO ACCESS DIFFERENT WIRELESS TELEPHONE NETWORK/SYSTEMS

FIELD OF THE INVENTION

This invention relates to the accessing of different and distinct cellular/wireless (C/W) telephone network/systems with a particular cellular/wireless (C/W) telephone instrument not necessarily adapted to operation in any one of the particular systems. Access is consummated by means of adapting an interface with the system requirements through adaptation of processing procedures of the cellular/wireless network/system alone. In particular the network adaptation process granting access and functionality is attuned for a C/W telephone instrument in response to entries transmitted to the network system from the C/W telephone instrument.

BACKGROUND OF THE INVENTION

A normal cellular/wireless (C/W) telephone instrument is designed to operate only with a particular cellular/wireless (C/W) communication network/system and as such is designed in accord with interface requirements specific to the network/system sought to be accessed. Such requirements include modulation schemes, format, signal structure, link protocols, signal waveforms and signal frequencies. These are all unique to each network/system and a cellular/wireless telephone instrument designed to work in one cellular/wireless network/system will not function in another C/W network/system having a different operating environment.

Traveling subscribers, particularly international travelers are impacted by inoperability of cellular/wireless telephone instruments in a different C/W system, particularly in international travel. In some instances a cellular/wireless telephone instrument is designed to be operative in more than one cellular/wireless/network/system. An example is cellular/cordless telephone instruments which operate in either a cellular or cordless medium. Such a telephone instrument however carries a large over head of redundant design and feature amenities. As a result such a telephone instrument is expensive and may even be unwieldy in size in order to support all the various features so that the user may properly interact with the different systems.

Several prior efforts have been made to accommodate the various dilemma of the traveling telephone user. A common dilemma is the different operating parameters and operating characteristics of C/W telephone instruments associated with different C/W networks. One solution to these dilemma has been to provide a "universal" telephone instrument associated with a network/system that accepts a database encoded on a card (e.g., a smartcard) to control and/or modify telephone instrument operations. This causes the telephone instrument to operate in a manner identical with operations that the user is used to in his home network/system.

Universal telephone instruments, for example, are associated with a particular network but can be programmed to mimic responses of a telephone instrument associated with a different telephone network. They often include a smartcard reader to provide a database for such purpose. The foreign user inserts a smartcard into the telephone instrument. It includes all the data as to how the telephone instrument should appear to the user, what language to use, how it should respond and how it is operated in order to make it conform to a telephone instrument that the user is accustomed to. A database of this operational information may be contained solely on the smartcard or it may be included in a database located in the universal telephone instrument. Such a technique is disclosed in U.S. Pat. No. 5,878,124, which also provides an overlay device to the telephone instrument to provide the home appearance and functions that the user is accustomed to. In this arrangement the universal telephone instrument is a specialized telephone instrument which must be provided by the system the user is attempting to access. It does not concern a cellular/wireless telephone instrument, which within the cellular/wireless network/system is personally assigned to the user and likely to be used in another system.

Personalized features of a home base network/system are provided to the traveling telephone user in using a telephone instrument in another network/system with a different exchange in which the user enters a code and a personal identification number (PIN) to any telephone instrument of a foreign system. The personalized features are retrieved from a national database, as described in U.S. Pat. No. 4,899,373, and used to provide the telephone user with his specialized features. In another aspect the features are encoded on a card which features are conveyed to the network database. Unfortunately from the point of view of a cellular/wireless telephone instrument the process does not make a C/W telephone instrument operative in a foreign network/system as opposed to providing familiar home type features to the user of a telephone instrument of a different system from the home system.

Various approaches have been proposed for making a foreign telephone user feel familiar with local telephone operations by providing features and functions such as they are accustomed to at home, but all have involved a using a special "universal" telephone instrument or are limited to providing system features such as are available to a user in his home network/system. Yet to be addressed is the ability of the visitor to the system to use his own C/W telephone instrument in a new different C/W network/system. This is particularly critical in the instance of cellular/wireless, since the user prefers to use his/her own C/W telephone instrument, which he/she is accustomed to.

SUMMARY OF THE INVENTION

A cellular/wireless (C/W) foreign subscriber/user, when roaming beyond a local cellular/wireless (C/W) network/system, compatible with his/her telephone instrument, is enabled to use her/his own cellular/wireless telephone instrument by entry of a code and a PIN into the foreign network/system desired to be used. The local serving C/W network/system algorithmically responds to the code and PIN by changing signal processing characteristics of the radio equipment of the network/system to accommodate operation of the subscriber's cellular/wireless telephone instrument with the foreign network/system desired to be used.

In a particular embodiment of the invention, the foreign user has been assigned an InterSystem Roamer Access Code Number (IRACN) and Personal Identification Number (PIN). This permits use of the C/W network/system upon application, followed by validation, to a C/W network/system designed to accommodate foreign subscriber telephone instruments. The radio communication system of the responds to the transmitted IRACN and PIN by adjusting its interfacing and signal processing equipment to interact with the cellular/wireless telephone instrument of the subscriber.

In operation the local C/W network/system receives the IRACN and PIN and upon validation detects and characterizes the signals transmitted by the subscriber's C/W telephone instrument and adjusts the receiver of the radio system to change the received signal to a format and character adjusted to the network/system operation requirements. Once identity and authentication is established the call may proceed normally. Reply downlink signals are changed to a format and character acceptable to the C/W telephone instrument prior to transmission.

In a specific embodiment, a foreign C/W subscriber requests service in the local C/W network/system, by using the cellular/wireless access channel and transmits the PIN and the IRACN to the central office (CO) of the local C/W network/system. The received signal is detected and characterized. A determination is made if it is a foreign or US (local) C/W service request, depending upon the C/W telephone instrument used. For US based C/W telephone instrument calls the process of registration and authentication proceeds as normal. For calls made using a foreign C/W telephone instrument, the received signal is characterized to determine if it is a GSM, TDMA, FDMA, PCS, etc. The signal is channeled to the appropriate radio system for that particular modulation and processing scheme. The uplink signal is frequency translated, and demodulated; it is decrypted and decoded, protocol converted, and deframed; it is subsequently structured and framed, modulated, frequency translated and adapted to NA (North American)-digital or analog radio system requirements in the local Central Office (CO).

Registration and authentication is initially performed to validate the subscriber PIN, IRACN and his/her identity. Transmitters of Invalid PIN and IRACN numbers are asked to check the numbers and try again. Valid subscriber entries are given a request acknowledgement to access the network and start transmitting. For a US based call, with a C/W telephone instrument designed for the local C/W network/system, registration and authentication follows normal operating procedure.

DESCRIPTION OF THE DRAWING

FIG. 5 is a schematic of a signal processor used in the circuitry of FIG. 4.

DETAILED DESCRIPTION

Figure 1:
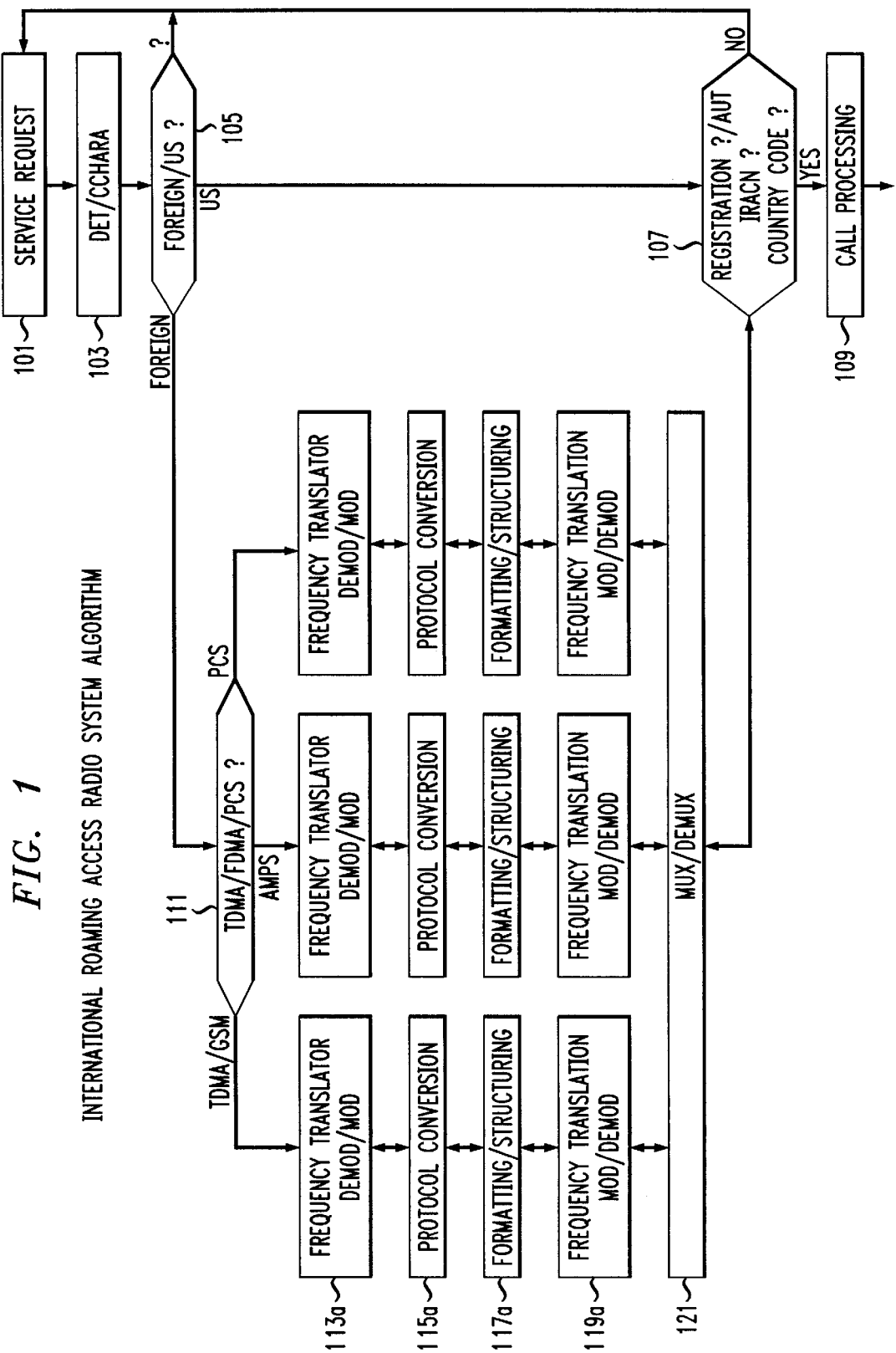
FIG. 1 is a block diagram illustrating the process of adapting the local cellular/wireless network/system to process signals supplied from a foreign non-system cellular/wireless telephone instrument.

An algorithmic process for adapting a foreign cellular/wireless telephone instrument for operation with a new/local cellular/wireless telephone network/system is shown in the flow chart of FIG. 1. A subscriber traveling within an area other than his/her home/foreign area wishes to use a cellular/wireless telephone instrument in a new area serviced by a local cellular/wireless telephone network/system different in operation and location from his/her normal home/foreign area. The process is initiated with a service request as indicated in block 101. The service request is transmitted over the access channel used by cellular/wireless network/systems for this purpose. The receiving network/system accepts/detects the signal and as indicated in the block 103 detects and characterizes the request signal as to its format, frequency, modulation, framing, etc. Whether the request for service is from a local or foreign cellular/wireless telephone instrument (i.e., foreign vs. US) is determined as indicated by decision block 105. If the request is from a US/local C/W telephone instrument the flow proceeds to process registration, authentication for US/local processing as indicated in decision block 107.

If the request is from a foreign cellular/wireless telephone instrument, as determined by the instructions of decision block 105, the flow proceeds to determine the type of modulation, as per decision block 111, that the requesting foreign cellular/wireless telephone instrument is using. For illustrative purposes three types of modulation are illustrated although it is to be understood that the invention is not limited to the three designated modulation types. If the detected modulation scheme is time division modulation (i.e., TDMA,GSM) the flow process proceeds all the way through blocks 113a, 115a, 117a and 119a. The system processing frequency is adjusted to the signal frequency and the demodulation scheme of the transmitting telephone instrument, as per block 113a. The protocol of conversion is adjusted as per block 115a to accommodate the transmitting telephone instrument. Appropriate formatting and structuring is performed in accord with the instructions of block 117a and frequency translation of the signal to the network/system values is performed as per block 119a. A Mux/Demux process 121 (multiplexer and demultiplexer) provides bi-directional connection between the appropriate processing circuitry and the requesting telephone instrument.

The Mux/Demux process 121 is coupled to a decision block 107 concerned with registration and authentication. If the codes (IRACN and PIN) entered are approved the flow proceed to call processing as shown in the block 109. The requesting telephone instrument may now communicate through the network/system. The process flow (b and c) for amps and PCS is similar to that for TDMA/GSM and hence it is not necessary to discuss.

If the origin of the calling telephone instrument is unknown to the network/system the decision process of block 105 the flow returns to the state of block 101.

When, as discussed above with reference to FIG. 1, an International Roamers Access Radio System (IRARS) participant requests service, the received signal frequency is determined, and the IRACN and PIN are verified for validity. The signal undergoes frequency adjustment, demodulation and carrier recovery, decoded and de-interleaved. It is deframed; the deframing process removes all the overhead bits by the Decision circuitry and stores it in the RAM. Only the information bits remain. Protocol conversion takes place, after bandwidth/time slot adjustment, channel spacing, and rate adjustment are made in the processor. The outputs of the protocol converter, as discussed below, are looped back to the modulator where signal is modulated with pi/4DQPSK, to adapt to NA-TDMA type modulation. The processor sends the modulated signal to the framer where the information is structured and adapted to NA-TDMA. It is encoded and interleaved such that the final bit count and the bit pattern is equal 1944 bits (972 symbols) per frame and is similar the NA-TDMA frame structure.

Figure 2:
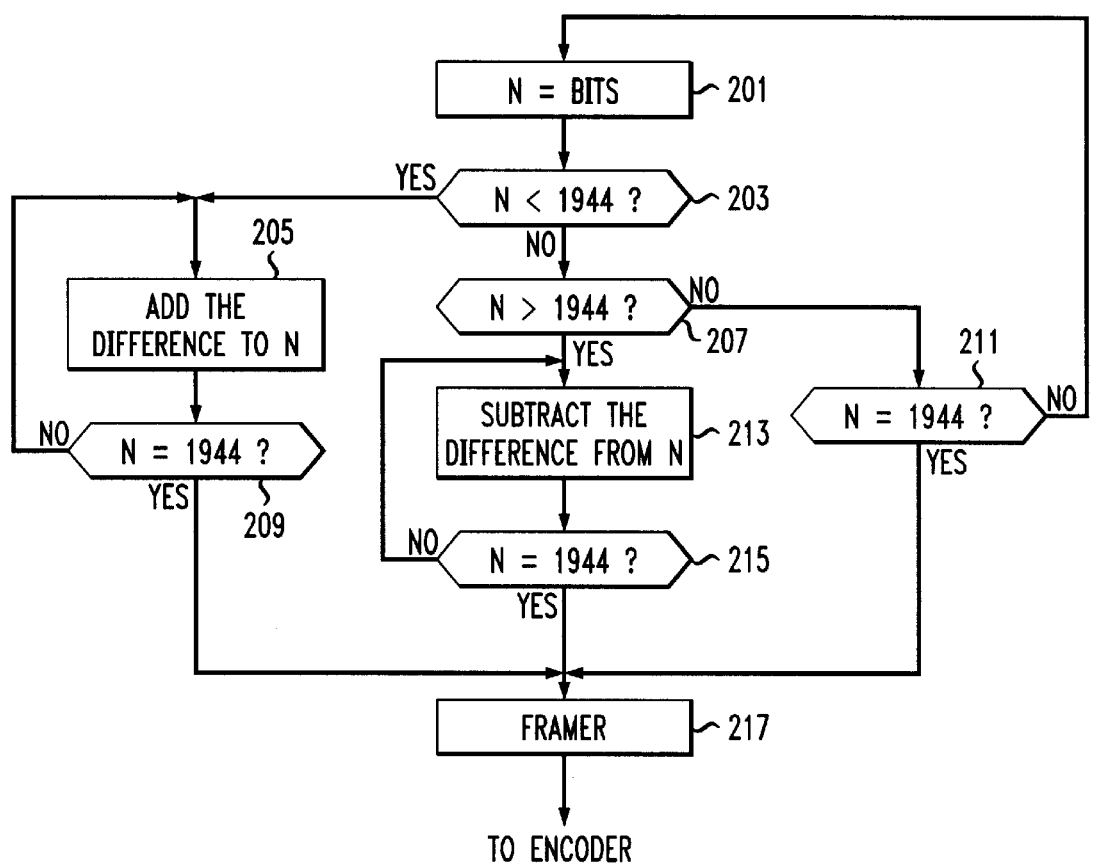
FIG. 2 is a block diagram illustrating an algorithmic framing process in adapting radio signals to allow the local network/system to provide service to a foreign cellular/wireless telephone instrument.
Figure 3:
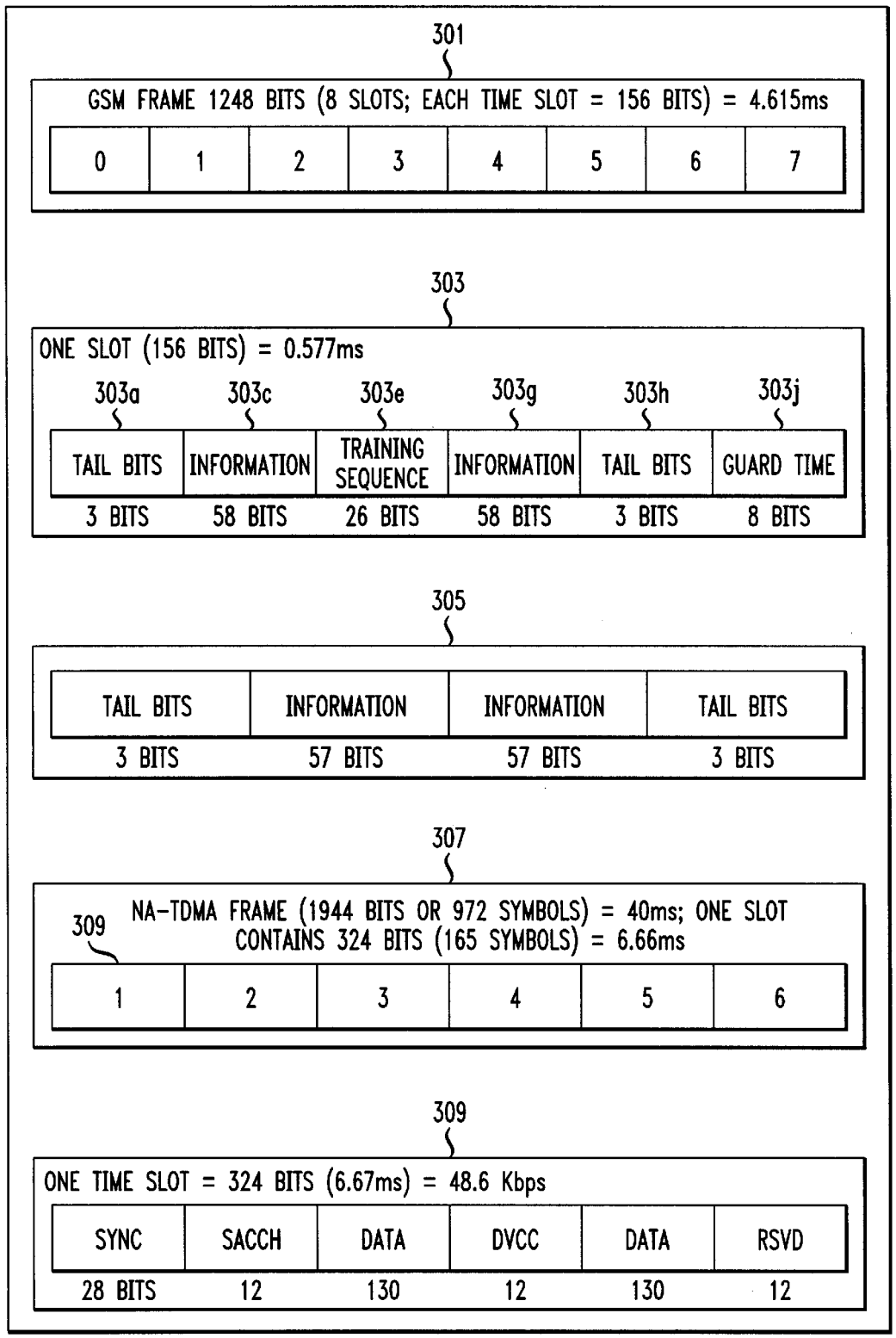
FIG. 3 is a schematic portrayal of frames structured by the process of FIG. 2.

FIG. 2 shows the framing algorithm to accomplish this structuring, and the bit patterns for the framing transformation are shown in the diagram of FIG. 3. For example, if the GSM system is chosen for processing, FIG. 2 shows the transformation algorithm for this modulation scheme. The invention is not limited to GSM framing and framing for other modulation schemes is included within the scope of the invention.

Framing processing starts with the number of bits N of the incoming frame being determined as indicated in block 201. If the number of bits N is less than 1944, as per decision block 203, the process proceeds to a block 205 whose instruction is to add the difference between the number of bits and 1944. If the number of bits now equals 1944 as per decision block 209 the process proceeds to the framing process of block 217 from whence the frame is transmitted to an encoder. If the number of bits N is not less than 1944 as per decision block 204 a subsequent decision (decision block 207) determines if the value of N exceeds 1944. If it doesn't then at this point in the process N should equal 1944, which is what decision block 211, determines. If n=1944 the process proceeds to framing step of block 217 and if not the process returns to the start block 201.

If the decision of block 207 determines that N exceeds 1944 a subsequent instruction of block 213 subtracts the difference from N. N should now equal 1944 and this is checked in decision block 215. If N=1944 the process proceeds to the framing of block 217 and if not the process returns to block 213 to repeat the subtraction step of block 213.

The results of the framing process are detailed graphically in the FIG. 3 diagram. The GSM frame 301 is shown comprising a total of 1248 bits with 8 slots each slot including 156 bits and a time duration of 4.615 ms. The content of each GSM slot 303 includes three tail bits 303a; fifty eight information bits 303c; a training sequence 303e of twenty six bits; fifty eight more information bits 303g; three tail bits 303h and a guard section 303j of eight bits. Each slot 303 has a total of 156 bits for a duration of 0.577 ms.

The frame 305 in process has a bit pattern in each slot in which all the overhead bits except the tail bits have been removed. This leaves 120 bits in each slot or a total of 960 bits per frame. The in-process frame is now adjusted to adapt the signal to the NA TDMA format and structure to be ready for encoding and interleaving.

The NA-TDMA frame 307 has 1944 bits or 972 symbols in which each slot 309 had 324 bits at a rate of 48.6 kbps or 6.67 ms/slot. This is the NA-TDMA frame and down link structure processed by the network/system.

When the subscriber is receiving signals the bit pattern is adapted to GSM standards, shown by frame 309, which the subscribers cellular/wireless telephone instrument is able to receive while GSM NA-TDMA transition is shown the invention is not so limited. Other transitions fall within the purview of the invention.

Figure 4:
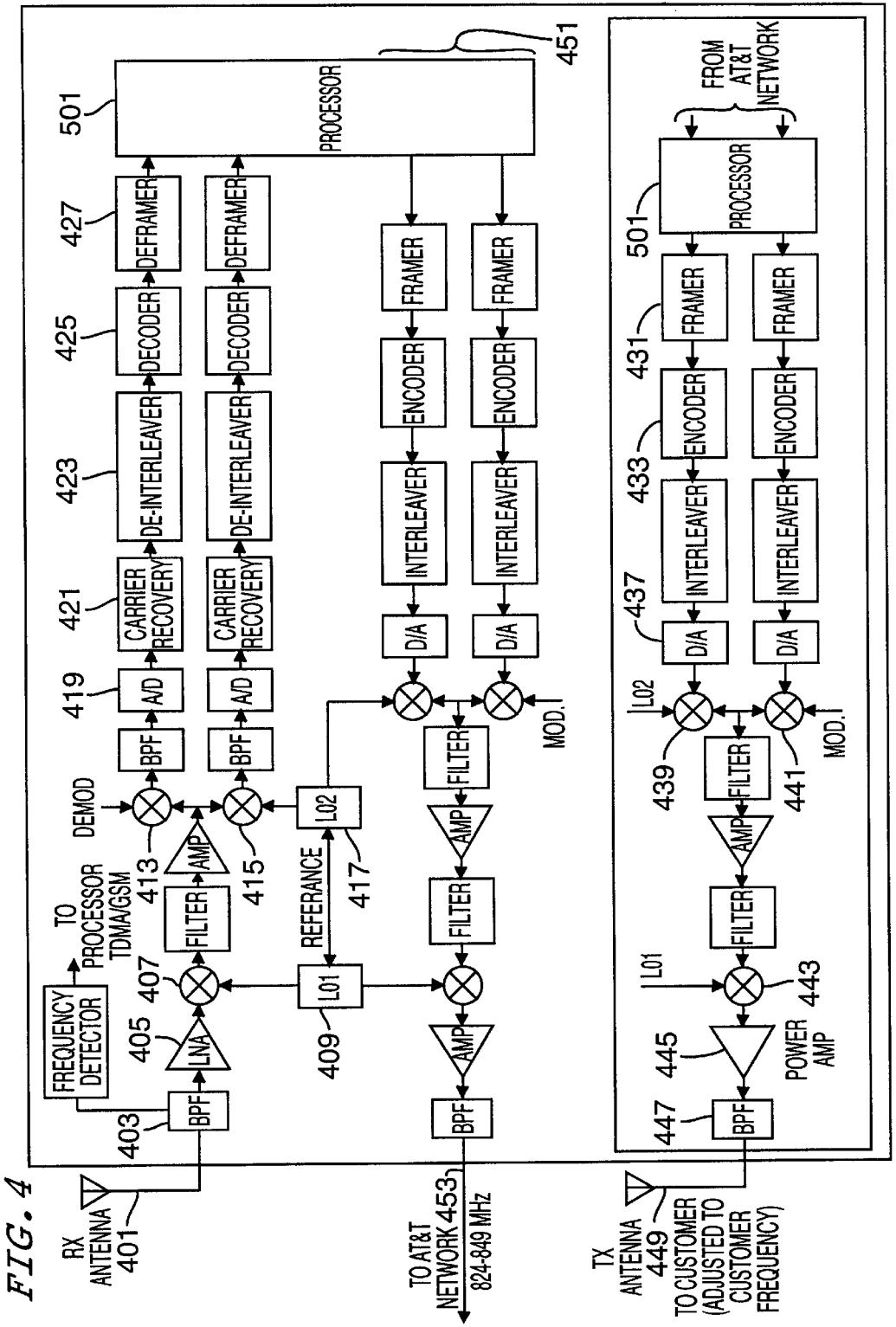
FIG. 4 is a block schematic of a radio system of a cellular/wireless telephone network/system incorporating the principles of the invention.

A radio transceiver used in the network/system, which illustrates the invention, is shown in the FIG. 4 and includes a RF front end; an IF section and a Baseband section. Uplink signals are received at a receiving antenna 401 and are coupled to a bandpass filter (BPF) 403.

A frequency detector is coupled to the input of BPF 403 and detects the frequency of the uplink signal as well as the type of system in use (i.e., GSM, PCS, FDMA, etc.) and IRARS and PIN validity. This frequency determination and other information determined is coupled to the IRARS processor 501 discussed below with reference to FIG. 4.

The filtered signal output of BPF 403 is amplified in amplifier 405 and mixed in mixer 407 with the reference signal frequency of local oscillator 409 to achieve the IF signal. After further filtering and amplification the signal is bifurcated to form I (In-phase) and Q (Quadrature-phase) signals. The I and Q signals are applied to mixers 413 and 415 for demodulation and referencing by a second reference signal (by local oscillator 417) to achieve baseband frequency, respectively. The signal is further processed, to recover original signal information, in both paths by an A/D converter 419 to recover a digital signal format and in various processes the carrier is recovered 421, and de-interleaved 423, decoded 425 (to recover original information) and deframed 427 (to remove overhead bits). These signals are applied to the processor 501 discussed in reference to FIG. 5. These signals are also processed in path 451 to adjust to signal characteristics of the local C/W network/system connected to lead 453.

Downlink I and Q signals, as processed in processor 501, are framed 431, encoded 433, interleaved 435 and converted from digital to analog format in D/A converter 437. Framing reinserts the overhead bits and structures the packet into a suitable format. The signal is modulated in mixer 439 and upped to IF frequency in mixer 441 to produce a modulated IF signal for the front end. After filtering and amplification the signal is converted to RF, suitable for the foreign subscriber's telephone instrument, in mixer 443 amplified in amplifier 445 filtered by BPF 447, for spectrum control, and applied to a transmitting antenna 449.

Processing to adjust the various uplink and downlink signals to the requirements of the cellular/wireless network/system processing the calls to the requirements of the subscribers instrument are performed by the processing circuitry 501. Processor 501 accepts both I and Q incoming signals from the subscriber, on leads 502 and 503, and in a pair of switches 504 and 505 selects subsequent circuit connections to (in the example) enable processing of GSM or NA-TDMA processing. Time slot control GBW (Gaussian Modulation Shift Keying BW) 541 applies a control signal to a GSM channel 514 or 516 and changes the time slots and framing of the GSM incoming signal. The I and Q signal has the rate appropriately adjusted in mixers 518 and 520, respectively, in response to control signals provided by a variable rate generator 526 which is controlled by a processor 530.

The same type process is used for NA-TDMA and other modulation schemes. This process is known to those skilled in the art and its implementation is not discussed.

A second channel is included to provide North American TDMA (NABW) control to a NA-TDMA channel 524 and 526 also under control of processor 530, through time slot control 543.

Outgoing signals (downlink) intended for the C/W telephone instrument of the foreign user are modulated to its operating requirements in mixers 551 and 552 and output on leads 561 and 562 to the radio output circuitry shown in the FIG. 4.

Signals for C/W network/system processing are output on leads 571 and 572.

What we claim is:

1. A local cellular/wireless (C/W) communication network/system having provision for operating with a foreign subscriber cellular/wireless telephone instruments designed for operation with a foreign cellular/wireless communication network system operating with a different signal format and set of parameters from that of the local C/W network/system, comprising:

circuitry for authenticating and enabling a foreign subscriber to operate in the local cellular/wireless telephone network/system with a foreign cellular/wireless telephone instrument, including:
  radio reception circuitry including means for accepting, prior to authentication and enabling,
    access request messages from the foreign subscriber cellular/wireless telephone instruments designed for operation with a foreign cellular/wireless communication network/system, and
    a Personal Identification Number (PIN) and an InterSystem Roamer Access Code Number (IRACN),
  the radio reception circuitry including means for authentication of the PIN and IIRACN and means for interacting in processing sending and receiving telephone calls of the foreign subscriber cellular/wireless telephone instrument using the different signal format and set of parameters of the foreign subscriber communication network system; the means for interacting including:
    means for channeling said telephone calls of the foreign subscriber cellular/wireless telephone instrument using the different signal format and set of parameters of the foreign subscriber communication network system into radio processing circuitry appropriate to the format used by the foreign subscriber cellular/wireless telephone instrument; and
    means for converting the telephone calls of the foreign subscriber cellular/wireless telephone instrument using the different signal format and set of parameters of the foreign subscriber communication network system into a structure suitable for normal processing by the local cellular/wireless communication network/system.

2. A local cellular/wireless (C/W) communication network/system, as claimed in claim 1, wherein:
  the means for converting further includes;
  time slot control circuitry connected for framing and deframing signals received from the foreign C/W telephone instrument and being returned to the foreign C/W telephone instrument.

3. A local cellular/wireless (C/W) communication network/system, as claimed in claim 1, wherein:
  the means for converting further includes;
  signal modulation means for modulating a local output signal to foreign C/W telephone instruments requirements prior to downlink transmission.

4. A local cellular/wireless (C/W) communication network/system, as claimed in claim 1, wherein:
  the means for accepting further includes;
  the means for detecting signal characteristics of an incoming signal from a C/W telephone instrument and determining the type of signal and identifying the system type of the transmitting C/W telephone instrument.

5. A method of enabling a foreign cellular/wireless (C/W) telephone subscriber to use a foreign cellular/wireless (C/W) telephone instrument in a local cellular/wireless (C/W) telephone network/system having different operating parameters and characteristics from those of the foreign subscribers normal foreign cellular/wireless (C/W) telephone network/system, comprising the steps of:
  assigning to the C/W telephone instrument of the telephone subscriber a Personal Identification Number (PIN) and an InterSystem Roamer Access Code Number (IRACN),
  providing within the local C/W telephone network/system provision for reception of Personal Identification Number (PIN) and an InterSystem Roamer Access Code Number (IRACN) in order to authenticate and enable the telephone subscriber to use the foreign C/W telephone instrument with the local cellular/wireless telephone network/system, including steps of:
    processing received radio signals with processing appropriate to the operating signals transmitted according to the operating parameters and characteristics of the foreign C/W telephone network/system by the foreign C/W telephone instrument within the local cellular/wireless telephone network/system; and
    transmitting radio signals appropriate to the processing functions of the foreign C/W telephone instrument from the local C/W telephone network/system.

6. The method of claim 5, wherein the step of providing; includes a step of:
  identifying operating signal characteristics for identifying the foreign system type the foreign C/W telephone instrument normally operates in.

7. The method of claim 6, wherein the step of processing includes a step of:
  converting modulation of the signal from the modulation processing of the foreign C/W telephone instrument to that of the local C/W network/system for processing in the local C/W network system.

8. The method of claim 5, wherein the step of transmitting includes a step of:
  converting modulation of the signal from the modulation processing of the local C/W network system to that of the foreign C/W telephone instrument.

9. The method of claim 5, wherein the step of processing includes a step of:
  converting the framing of a signal received from the foreign C/W telephone instrument to framing standards of the local C/W network/system.

10. The method of claim 5, wherein the step of transmitting includes a step of:
  converting framing of a signal processed by the local C/W network/system to that framing used by the foreign C/W telephone instrument.

11. A wireless transceiver for use in a local wireless communication system having provision for operating with a foreign subscriber wireless device designed for operation with a foreign wireless communication system of a type operating with a different signal format and set of parameters from that of the local wireless system, comprising:
  wireless receiver circuitry to receive a signal from the foreign subscriber wireless device;
  authentication circuitry for authenticating and enabling a foreign subscriber to operate in the local wireless communication system based on a Personal Identification Number (PIN) and an InterSystem Roamer Access Code Number (IRACN);
  detection circuitry to determine the communication system type with which the signal is compatible;
  a plurality of processing circuits, each processing circuit adapted to process signals having the respective signal format and set of parameters of a particular communication system type;
  channeling circuitry adapted to channel the signal when determined to be compatible with the communication system type of the foreign wireless communication system to a processing circuit adapted to process signals having the different signal format and set of parameters of the foreign wireless communication system; and converting circuitry adapted to convert signals having the different signal format and set of parameters of the communication system type of the foreign wireless communication system into a structure suitable for normal processing by the local wireless communication system.

12. The wireless transceiver of claim 11, comprising:

a first processing circuit adapted to convert GSM signals; and a second processing circuit adapted to convert TDMA signals.

13. The wireless transceiver of claim 12, further comprising:

a third processing circuit adapted to convert FDMA signals; and a fourth processing circuit adapted to convert PCS signals.

14. The wireless transceiver of claim 11, further comprising processing circuitry to:

convert the signal into a converted signal compatible with the North American TDMA; and the interface circuitry adapted to interface with a network compatible with the North American TDMA.

15. The wireless transceiver of claim 11, further comprising:

a processing circuit to determine whether the signal is North American TDMA or another type.

16. The wireless transceiver of claim 11 wherein each processing circuit is adapted to:

perform frequency adjustment, demodulation, decoding, de-interleaving, deframing and protocol conversion of signals compatible with a particular communication system type.

17. A method for enabling a wireless transceiver of a local wireless network to operate with a foreign subscriber wireless device designed for operation with a foreign wireless communication network of a type operating with a different signal format and set of parameters from that of the local wireless network, comprising:

receiving from the foreign subscriber wireless device a signal comprising an InterSystem Roamer Access Code Number (TRACN) for the device and a personal identification number (PIN) for the user of the device;

determining from the signal the communication system type with which the signal is compatible;

channeling the signal to one of a plurality of processing circuits, each processing circuit adapted to process signals having the respective signal format and set of parameters of a particular communication system type;

in a case where the signal is compatible with a communication system type other than that of the local wireless network, converting the signal into a structure suitable for normal processing by the local wireless communication network; and communicating the IRACN and the personal identification number to the network in which the device is roaming to validate the device and authenticate the user.

18. The method of claim 17 further comprising:

converting the signal from a communication system type that is one of GSM, TDMA, FDMA, and PCS to North American TDMA.

19. The method of claim 17 further comprising:

determining whether the communication system type of the signal is North American TDMA or a foreign type.

20. The method of claim 17 further comprising:

performing frequency adjustment, demodulation, decoding, de-interleaving, deframing and protocol conversion of the signal.

* * * * *

UNITED STATES PATENT AND TRADEMARK OFFICE
CERTIFICATE OF CORRECTION

| | |
|---|---|
| PATENT NO. | : 6,754,490 B2 |
| APPLICATION NO. | : 09/384451 |
| DATED | : June 22, 2004 |
| INVENTOR(S) | : Okoro et al. |

It is certified that error appears in the above-identified patent and that said Letters Patent is hereby corrected as shown below:

December 14, 2002 From PTO-892

The following patents listed on the 12/14/02 IDS Form PTO-892 Notice of References Cited by Examiner should be listed on the cover of the issued patent:
- 5,610,973 (Comer)
- 5,862,481 (Kulkarni et al.)
- 6,259,914 (Koster)

In the Specification

Column 1 line 43, "over head" should read --overhead--.
Column 2 line 36, "a using" should read --using--.
Column 2 line 63, "of the" should be deleted.
Column 4 line 41, "proceed" should read --proceeds--.
Column 4 line 46-48, "system the" should read --system. The--.
Column 4 line 66, "equal" should read --equal to--.
Column 4 line 67, "similar" should read --similar to--.
Column 5 line 45, "NA TDMA" should read --NA-TDMA--.
Column 5 line 53, "subscribers" should read --subscriber's--.
Column5 line 53-55, "receive while" should read --receive. While--.
Column5 line 53-55, "shown the" should read --shown, the--.
Column 6 line 33, "subscribers" should read --subscriber's--.

UNITED STATES PATENT AND TRADEMARK OFFICE
CERTIFICATE OF CORRECTION

PATENT NO. : 6,754,490 B2
APPLICATION NO. : 09/384451
DATED : June 22, 2004
INVENTOR(S) : Okoro et al.

It is certified that error appears in the above-identified patent and that said Letters Patent is hereby corrected as shown below:

In the Claims

Column 7 claim 1, "IIRACN" should read --IRACN--.
Column 7 claim 5, "subscribers" should read --subscriber's--.
Column 8 claim 6, "providing;" should read --providing--.
Column 10 claim 17, "TRACN" should read --IRACN--.

Signed and Sealed this

Eighteenth Day of July, 2006

JON W. DUDAS
*Director of the United States Patent and Trademark Office*